United States Patent [19]
Abe et al.

[11] Patent Number: 5,658,666
[45] Date of Patent: Aug. 19, 1997

[54] ROLLING BEARING

[75] Inventors: Tsutomu Abe; Kyozaburo Furumura, both of Kanagawa, Japan

[73] Assignee: NSK Ltd., Tokyo, Japan

[21] Appl. No.: 616,937

[22] Filed: Mar. 18, 1996

Related U.S. Application Data

[63] Continuation of Ser. No. 331,751, Oct. 31, 1994, abandoned.

[30] Foreign Application Priority Data

Oct. 29, 1993 [JP] Japan .................................. 5-272544

[51] Int. Cl.$^6$ ........................................................ B32B 9/00
[52] U.S. Cl. ........................ 428/408; 29/527.7; 384/493; 384/494; 384/516
[58] Field of Search ......................... 29/527.7; 428/408; 384/493, 494, 516; 164/476, 473

[56] References Cited

U.S. PATENT DOCUMENTS

| | | | |
|---|---|---|---|
| 3,974,559 | 8/1976 | Kawawa | 29/527.7 |
| 4,014,683 | 3/1977 | Miltenberger | 164/473 |
| 4,519,439 | 5/1985 | Fredriksson | 164/476 |
| 4,747,445 | 5/1988 | Ogibayashi | 164/476 |
| 4,964,742 | 10/1990 | Kagawa | 384/492 |
| 5,259,886 | 11/1993 | Utsumi et al. | |
| 5,427,458 | 6/1995 | Sanchez | 384/516 |

FOREIGN PATENT DOCUMENTS

| | | | |
|---|---|---|---|
| 49-121738 | 11/1974 | Japan . | |
| 49-121733 | 11/1974 | Japan . | |
| 3254339 | 11/1991 | Japan | B22D 11/128 |
| 3254340 | 11/1991 | Japan | B22D 11/128 |
| 3254341 | 11/1991 | Japan | B22D 11/128 |
| 3254342 | 11/1991 | Japan | B22D 11/128 |

OTHER PUBLICATIONS

Erwin V. Zaretsky, "Selection of Rolling-Element Bearing Steels for Long-Life Applications" *Effect of Steel Manufacturing Processes on the Quality of Bearing Steels, ASTM STP 987*, J.J.C. Hoo, Ed., American Society for Testing and Materials, Philadelphia, 1988, pp. 5, 25–28, 41–43.

ATSM, SPT987, (1988), pp. 278–292.

"Iron and Steel" (vol. 73, No. 3, 1987) pp. 111–117.

"JIS Handbook" 1993, Iron Steel, pp. 302–303.

Primary Examiner—William Krynski
Attorney, Agent, or Firm—Sughrue, Mion, Zinn, Macpeak & Seas

[57] ABSTRACT

A rolling element of a rolling bearing is made of a continuously cast bearing steel, and the center segregation rate of carbon, $C/C_0$, of the bearing steel material satisfies a condition, $0.9 \leq C/C_0 \leq 1.1$, where $C$ is the concentration of carbon (wt. %) in a center portion and $C_0$ is the average concentration of carbon (wt. %).

2 Claims, 5 Drawing Sheets

RADIAL LOAD

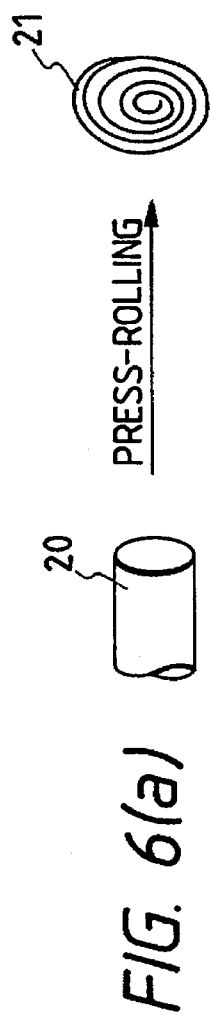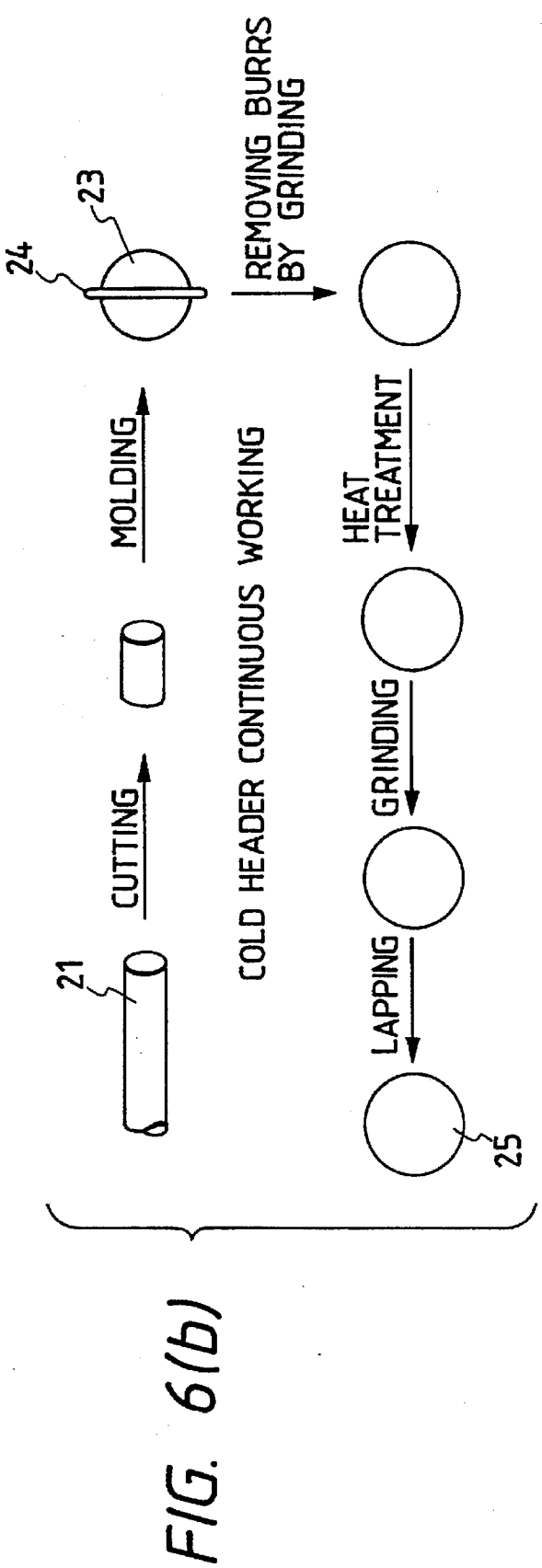
FIG. 6(a)
FIG. 6(b)

ROLLING BEARING

This is a Continuation of application Ser. No. 08/331,751 filed Oct. 31, 1994, now abandoned.

BACKGROUND OF THE INVENTION

The present invention relates to rolling bearings and, more particularly, to an improvement of a rolling bearing used in automobiles, construction machinery, railroad vehicles, and other industrial machinery.

A variety of studies have heretofore been made to improve the life of rolling bearings. For example, it is most effective to decrease the content of oxygen in steel (hereinafter referred to as "oxygen content in steel") in order to reduce the presence of an oxide inclusion typically represented by alumina, which is one of the causes hampering the improvement of the rolling life of the bearings. Thus, to overcome this problem, many steelmakers are making efforts to improve various steelmaking technologies.

In the meantime, vacuum degassing and ladle refining furnace (LF) processes have been introduced in the field of bearing steels, and in the early 1980s any makers came to adopt steels made by continuous casing (hereinafter referred to as "CC steels") instead of steels made by ingot casting (hereinafter referred to as "IC steels") for their bearing steels.

In the continuous casting process for bearing steels, a large difference in the temperature of a steel exists between solidification start and solidification end, because the concentration of carbon in the steel is high. This has caused the problem that elements such as carbon, chromium, manganese, phosphorus, and sulfur are locally segregated and concentrated in the center portion of the steel to thereby shorten the rolling life of the bearings. Therefore, to improve the quality problems such as center segregation, flotation of inclusions, and unstable solidification structure, the development of sophisticated steelmaking technologies have been called for.

Recent developments such as an electromagnetic stirring process (EMS), a light reduction process with pinch rolls, and a continuous forging process have substantially eliminated the difference in rolling life between IC steel bearings and CC steel bearings.

For example, as described on page 288 of ASTM SPT987 (1988), from the result of a thrust life test carried out on samples cut out of a steel material in parallel with one another in the rolling direction including the center portion of the material, it has been verified that the rolling life of a rolling bearing made of a CC steel is rather longer than that of a rolling bearing made of an IC steel.

With respect to the relationship between flaking positions and rolling life, there has been no such report that the rolling life becomes shorter in the center porions of CC steels.

A report similar to the aforementioned has been made on page 116 of "Iron and Steel" (Vol. 73, No. 3, 1987).

Based on these reasons, many CC steels are used together with IC steels to make the inner and outer rings of rolling bearings in current production. The inner ring and the outer ring are made mainly of rods and tubes. The segregated center portion is hardly exposed to the functional surfaces of the bearing (particularly, to the groove surfaces) during the process of machining the steel material into the inner ring and the outer ring after lathing, hot forging, and warm forging.

That is, in the case of making the inner ring and the outer ring by hot forging and warm forging a rod, the center portion of the steel material is subjected to piercing, which removes the harmful center segregates.

Also, in the case of making the inner ring and the outer ring by lathing a tube, the segregated center portion on the inner-diameter surface of the tube is made harmless by lathing when the outer ring is made, because a large amount of such portion is lathed to make grooves. When the inner ring is made, the rolling life is not affected, because the segregated center portion coincides with the inner-diameter surface of the bearing.

From these points of view, CC steels have recently been adopted as the material of the inner and outer rings. That is, low cost, excellent cleanness, and excellent quality in streak flaw of the CC steels have prevailed over the center segregation problem thereof that has not yet been completely overcome.

On the other hand, with respect to the rolling elements, the most generally used material is a wire material. As shown in FIG. 6(b), the rolling elements are made by cold working (cold header working).

Specifically, as shown in FIG. 6(a), e.g., a steel material (billet) 20 is press-rolled to make a coil of steel strip 21.

Then, as shown in FIG. 6(b), the steel strip 21 is cut to a desired length by a cold header, and the cut pieces are formed to produce spherically formed products 23. Each formed product 23 has burrs 24. After removing the burrs by grinding, the formed product 23 is subjected to a heat treatment. The formed product 23 is ground and then lapped to obtain a rolling element 25 having a desired size.

In the thus formed rolling element 25 by cold working, the segregated center portion of the billet 20 is exposed at poles 30A and 30B of the rolling element 25 as shown in FIG. 7, i.e., at two functional surfaces. These poles 30A and 30B, combined with their exposure to the surface perpendicular to the rolling direction, become susceptible to flaking and cracking, which causes reduction in rolling life and deterioration in strength.

This has kept bearing makers from using CC steels having the problem of center segregation as the material of rolling elements. Therefore, IC steels are currently used as the material of rolling elements.

However, IC steels, requiring cutting of the nonuniform top and bottom portions of an ingot in the rolling process, are expensive compared with steels that are continuously cast.

In addition, IC steels are susceptible to streak flaws by chips of hot metal passage bricks and deoxidation products accidentally entrapped in the initially solidified layer during ingot making.

On the other hand, to improve the center segregation in CC steels, a continuous forging method disclosed in, e.g., Japanese Unexamined Patent Publications Nos. Hei. 3-254339, Hei. 3-254340, and Hei. 3-254341, and a light reduction process by pinch rolls disclosed in Japanese Unexamined Patent Publication No. Sho. 49-121738 are available. There is also a technique that can improve macrosegregation by causing the liquid steel having the concentrations of carbon, chromium, and the like to move up while deforming the CC strand with pressure applied thereto at the final stage of solidification during continuous casting.

However, such technique for improving the macrosegregation has a problem to be overcome. The problem is such that the relationship between the center segregation rate of carbon ($C/C_0$) of a steel material (where C is the concentration of carbon in the center portion (wt. %) and $C_0$ is the average concentration of carbon of the steel material (wt.

%)) and the rolling life of the rolling element has not yet been fully analyzed.

SUMMARY OF THE INVENTION

The present invention has been made to overcome the aforementioned problem, and an object of the present invention is, therefore, to provide an inexpensive, high-quality, and long-life rolling bearing by analyzing the relationship between the center segregation rate of carbon (C/C$_0$) and the rolling life in both of a steel material of the rolling element and a steel as a finished product of the rolling element.

To achieve the above object, the present invention is applied to a rolling bearing that includes an inner ring, an outer ring, and a plurality of rolling elements interposed between the inner ring and the outer ring, and in such rolling bearing, each of the plurality of rolling elements is made of a continuously cast bearing steel, with the center segregation rate of carbon, C/C$_0$, of the bearing steel satisfies a condition, $0.9 \leq C/C_0 \leq 1.1$, where C is the concentration of carbon (w. %) in the center portion, and C$_0$ is the average concentration of carbon (wt. %), and the aforementioned bearing steel contains oxygen in amounts of 10 ppm or less and sulfur in amounts of 80 ppm or less.

The center segregation rate of sulfur, S/S$_0$, of the bearing steel satisfies a condition, $0.9 \leq S/S_0 \leq 1.1$, and the bearing steel contains oxygen in amounts of 10 ppm or less and sulfur in amounts of 80 ppm or less.

According to the present invention, the material of which the rolling element is made is a continuously cast bearing steel, and not only the center segregation rate of carbon (C/C$_0$) of the bearing steel satisfies a condition, $0.9 \leq C/C_0 \leq 1.1$, but also the bearing steel contains oxygen in amounts of 10 ppm or less and sulfur in amounts of 80 ppm or less. Therefore, reduction in the cost of manufacture, improvement in quality, as well as improvement in rolling life can be achieved.

The reasons why such advantages can be obtained will be described below.

Since a continuously cast bearing steel is used as the material of the rolling element in the present invention, productivity is improved; cost of manufacture is reduced; cleanness is improved; and streak flaw control becomes superior compared with IC steels.

The problem of the center segregation quality of a conventional CC steel has been improved significantly for the following reasons.

The rolling element, in most cases, initiates flaking and cracking at positions to which the segregated center portion is exposed, i.e., at the poles of the rolling element. The present inventors have found that flaking and cracking can be suppressed and rolling life can thereby be improved by reducing the center segregation rate of carbon (C/C$_0$) to some extent.

That is, the center segregation rate of carbon (C/C$_0$) indicates in what degree carbon is concentrated and segregated in the center portion of a steel material with respect to the average concentration of carbon (C$_0$) in such material. The present inventors verified that rolling life could be improved significantly when the center segregation rates of carbon (C/C$_0$) of a steel material and of a steel as a finished product are 1.1 or less.

When the center segregation rate of carbon (C/C$_0$) of the steel material and of the steel as a finished product exceeds 1.1, carbon and sulfur that is a trace impurity element concentrate at positions corresponding to the poles of the rolling element. As a result, carbide and sulfide inclusions increase and, therefore, flaking and cracking initiate during use from such positions (poles) to which the segregated center portion is exposed. As a result, rolling life is reduced.

The lower limit of the center segregation rate of carbon (C/C$_0$) is about 0.9 in terms of the manufacturing practice using general center segregation control processes such as EMS and light reduction with pinch rolls. If the center sefregation rate of carbon is made lower than 0.9, a higher cost is required so that it becomes impossible to obtain a rolling bearing which meets the object of the present, that is, the rolling bearing with the low cost, high quality and long life.

Hence, the center segregation rates of carbon (C/C$_0$) of a steel material and of a steel as a finished product are limited between 0.9 and 1.1.

In the present invention, the following way was taken to evaluate the center segregation rate of carbon (C/C$_0$) of a steel material and the center segregation rate of carbon (C/C$_0$) of a steel as a finished product.

[Center segregation rate of carbon (C/C$_0$) of a steel material]

As shown in FIG. 2, the concentration of carbon (C) in the center portion of the steel material (billet) 20, which is the base material of the bearing steel, can be measured by a combustion-infrared absorptiometric method while taking a sample out of the billet with a drill or the like. The sample is taken from an area extending from the center within a radius of $0.01 \times D_x$ to $0.02 \times D_x$ when the cross-section of the material (billet) 20 has a diameter $D_x$ (the diameter $D_x$ being the diameter of a circle if the cross-section is circular and being the length of a single side if the cross-section is polygonal).

On the other hand, the average concentration (C$_0$) of carbon of the steel material can be obtained by measuring the concentrations of carbon at desired positions (C$_1$, C$_2$, C$_3$, and C$_4$) at a radius of $D_x/4$ by the combustion-infrared absorptiometric method while taking samples at such positions by a drill or the like similar to that described above as shown in FIG. 2, and then by averaging the measured values.

The center segregation rate of carbon (C/C$_0$) of the steel material was evaluated with the thus obtained values.

[Center segregation rate of carbon (C/C$_0$) of a steel as a finished product]

The concentration of carbon (C) in the center portion of a steel as a finished product (rolling element) is measured with EPMA (electron beam microanalyzer). That is, as shown in FIG. 3, a cross-section passing through both poles of the finished product is cut out, and subjected to linear analysis in a direction perpendicular to the fiber flow of the center portion of the finished product (rolling element). The concentration of carbon is then obtained based on this linear analysis. The concentration of carbon (C) in the center portion is obtained by averaging the carbon content measurements made on an area extending from the center portion within a radius of $0.01 \times D_y$ to $0.02 \times D_y$, assuming that the diameter of the cross-section of the finished product is equal to $D_y$.

On the other hand, the average concentration of carbon (C$_0$) of the steel as a finished product is obtained by measuring the concentrations of carbon at (two) positions, each being distant from the center by $D_y/4$ in the radial direction as shown in FIG. 3, and averaging the measured values.

The center segregation rate of carbon (C/C$_0$) of the steel as a finished product was evaluated with the thus obtained values.

Further, from a study made by the present inventors, it was verified that when the oxygen content in steel exceeded 10 ppm even if the center segregation rate of carbon ($C/C_0$) was between 0.9 and 1.1, oxide inclusions increased, and therefore flaking and cracking initiated during use from the portions (poles) to which the segregated center portion was exposed. As a result, rolling life is decreased.

It was also verified that when the sulfur content in steel exceeded 0.008 wt % (80 ppm) even if the center segregation rate of carbon ($C/C_0$) was between 0.9 and 1.1, sulfide inclusions increased, and therefore flaking and cracking initiated during use from the portions (poles) to which the segregated portion is exposed. As a result, rolling life is decreased.

In the present invention, the oxygen content in steel and the sulfur content in steel were obtained by measuring such contents at arbitrarily selected plurality of positions according to the combustion-infrared absorptiometric method, and by averaging the measured values.

When the rolling life of a rolling element made of the CC steel whose center segregation rate of carbon ($C/C_0$) is between 0.9 and 1.1, whose oxygen content in steel is 10 ppm or less, and whose sulfur content in steel is 80 ppm or less (the CC steel of the present invention) was compared with the rolling life of a rolling element made of an IC steel, it was verified that the rolling bearing made of the CC steel of the present invention was superior in rolling life.

Therefore, a continuously cast bearing steel (CC steel) is used as the material of the rolling element, and the center segregation rates of carbon ($C/C_0$) of the steel material and of the steel as a finished product are limited to values between 0.9 and 1.1. In addition, the oxygen content in steel is limited within 10 ppm and the sulfur content in steel is limited within 80 ppm.

BRIEF DESCRIPTION OF THE DRAWINGS

FIG. 6(a) is a diagram showing a part of a process of making rolling elements (balls), that is, a process of making a wire out of a steel material (billet), for ball bearings out of a wire, FIG. 6(b) is a diagram showing a part of a process of making rolling elements (balls) for ball bearings out of a wire.

DETAILED DESCRIPTION OF THE PREFERRED EMBODIMENTS

Figure 1A:
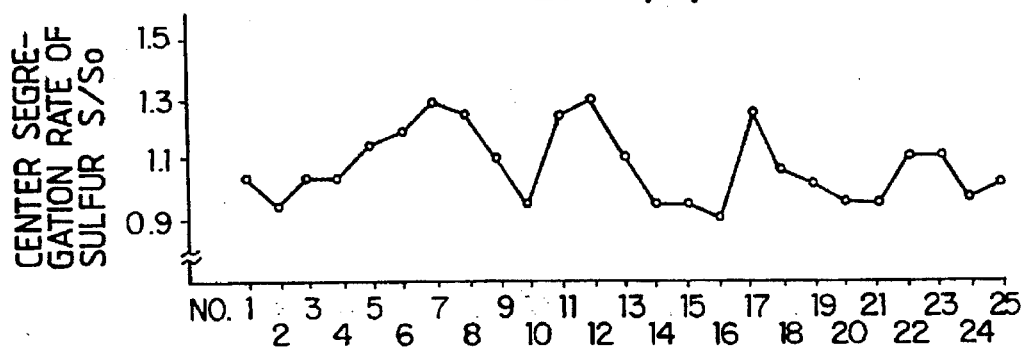
FIG. 1(a) is a diagram showing center segregation rates of sulfur ($S/S_0$) of steel materials of Embodiments Nos. 1 to 4 of the present invention and of Comparative Examples Nos. 5 to 25.

Preferred embodiment of the present invention will now be described.

Steel materials (billets), each being a rod-like member (base material of a wire) that is circular in cross-section, were prepared. Each steel material had such chemical composition (wt. %) as shown in Table 1.

It should be noted that steel materials (billets), each having a diameter of 180 mm in cross-section, were selected in this embodiment.

TABLE 1

| | No. | Type of steel | Chemical composition (wt. %) | | | | | | | | | |
|---|---|---|---|---|---|---|---|---|---|---|---|---|
| | | | C | Si | Mn | P | S | Ni | Cr | Mo | Cu | Ti |
| Embodiment | 1 | CC | 0.98 | 0.31 | 0.42 | 0.012 | 0.003 | 0.08 | 1.44 | 0.02 | 0.05 | 0.002 |
| | 2 | | 1.01 | 0.26 | 0.39 | 0.013 | 0.005 | 0.10 | 1.43 | 0.01 | 0.08 | 0.004 |
| | 3 | | 1.02 | 0.22 | 0.36 | 0.017 | 0.007 | 0.05 | 1.40 | 0.02 | 0.04 | 0.003 |
| | 4 | | 0.99 | 0.26 | 0.41 | 0.014 | 0.008 | 0.09 | 1.38 | 0.01 | 0.10 | 0.002 |

Then, the oxygen contents in steel of the steel materials (Embodiments Nos. 1 to 4) having the chemical composition shown in Table 1 were measured by the following method.

The method involves the steps of: cutting samples out of arbitrarily selected four positions from the respective steel materials (Embodiments Nos. 1 to 4) with a 5 mm-diameter drill; measuring the oxygen contents (ppm) in the obtained samples by the combustion-infrared absorptiometric method; and averaging the measured values.

The results of the measurement are shown in Table 2.

Then, the center segregation rates of carbon ($C/C_0$) of the steel materials (Embodiments Nos. 1 to 4) having the chemical composition shown in Table 1 were evaluated by the following method.

The method involves the steps of: obtaining samples by cutting the center portion of the respective steel materials (Embodiments Nos. 1 to 4) with a radius of 2.5 mm by using the 5 mm-diameter drill; and measuring the carbon concentrations (wt. %) of the samples by the combustion-infrared absorptiometric method to obtain the carbon concentration (C) of the center portion of the respective steels.

Then, sampling was made on each steel material at four positions that are distant from the center by 45 mm in the radial direction with the 5 mm-diameter drill to obtain samples $C_1$, $C_2$, $C_3$, and $C_4$.

Then, the carbon concentrations (wt. %) present in the respective samples were measured by the combustion-infrared absorptiometric method, and the measured values were averaged to obtain the average carbon concentration ($C_0$) of the respective steels.

Then, the center segregation rates of carbon ($C/C_0$) of the respective steel materials were calculated from the carbon concentrations (C) in the center portions of the respective steel materials and the average carbon concentrations ($C_0$) obtained by the aforementioned method.

The results are shown in Table 2.

Then, using the respective steel materials (Embodiments Nos. 1 to 4), rolling elements (balls) were made by the process shown in FIGS. 6(a) and 6(b). It should be noted that the steel materials were subjected to electromagnetic stirring (EMS) and light reduction with pinch rolls at the final stage of solidification as a measure to suppress center segregation in this embodiment.

The diameter of the ball of each finished product (rolling element) was set to ⅜ inch, and the grade of the steel conformed to Grade 10 of the JIS classification.

Then, the respective rolling elements were subjected to a rolling life test.

Figure 4:
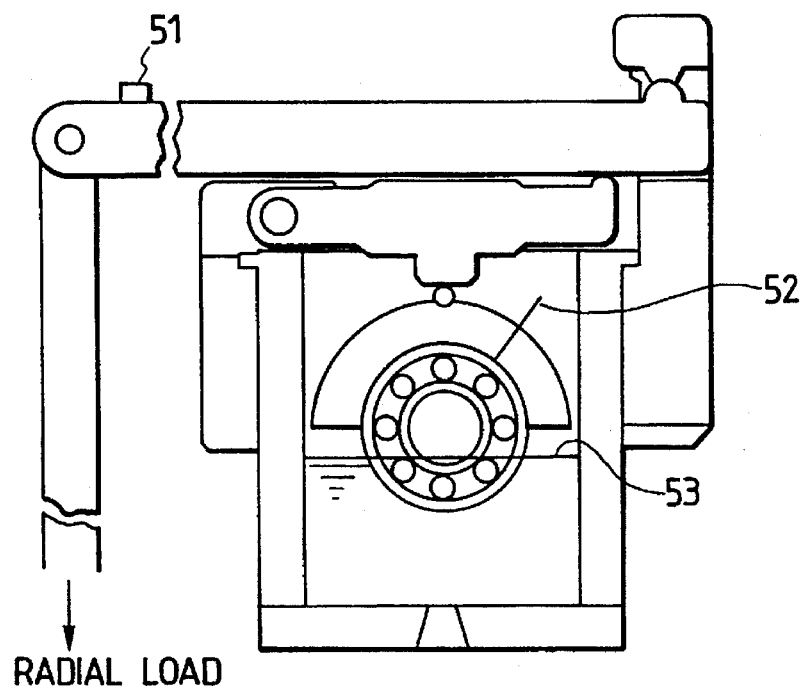
FIG. 4 is a sectional view of a known radial life test machine used for a rolling life test of the embodiments of the present invention.
Figure 5:
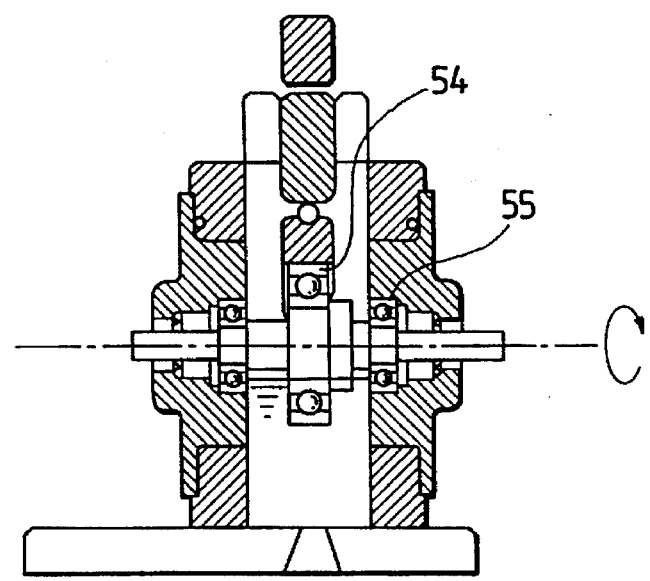
FIG. 5 is a sectional view of the known radial life test machine used for the rolling life test of the embodiments of the present invention.
Figure 7:
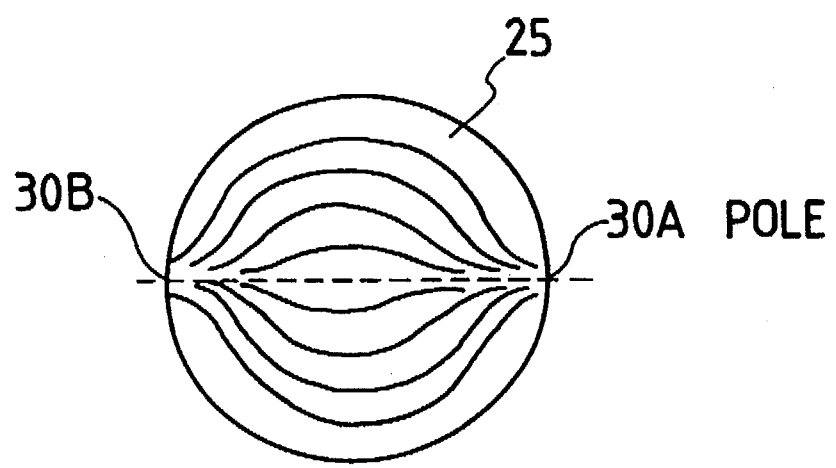
FIG. 7 is a fiber flow diagram of a cross-sectional surface of a rolling element (ball), in which the cross-sectional surface is taken in an axial direction of a steel of which the rolling element (ball) is made.

Using a radial life test machine shown in FIGS. 4 and 5, as well as an inner ring and an outer ring of a deep groove ball bearing No. 6206 (a ball bearing whose inner diameter is 30 mm) as a test bearing 54, the rolling elements were assembled to these inner and outer rings to carry out a durability test under the following conditions.
(Conditions)

Bearing: Deep groove ball bearing No. 6208 (inner ring and outer ring)

Rolling element: A total of 9 (nine) ⅜-inch rolling elements were assembled together.

Bearing gap: C3

Cage: Nylon cage

No. of revolutions: 3900 rpm

Lubrication: Turbine oil (VG68 in oil bath)

Radial load: 13.8 KN

Detection of flaking: Acceleration sensor

It should be noted that the test under the aforementioned conditions was repeated 20 times per type of rolling element (a group of 9 rolling elements was subjected to the test 20 times, making a total of 180 balls tested). Upon flaking of either the inner ring or the outer ring before the rolling elements start flaking, the inner ring or the outer ring suffering from flaking was replaced with a new one to continue the test, whereas upon flaking of any single rolling element, such moment was deemed as defining the rolling life of the bearing.

It should also be noted that the rolling life data were arranged on a Weibull plot and were evaluated in terms of a 10% failure probability life ($L_{10}$).

The results of the evaluation are shown in Table 2.

TABLE 2

|  | No. | Oxygen content in steel (ppm) | Center segregation rate ($C/C_0$) | Rolling life ($L_{10}$) (hr) |
| --- | --- | --- | --- | --- |
| Embodiment | 1 | 8 | 1.00 | 625 |
|  | 2 | 5 | 0.90 | 720 |
|  | 3 | 6 | 1.05 | 585 |
|  | 4 | 10 | 1.10 | 603 |

Then, after the rolling life test was ended, all the rolling elements (Embodiments Nos. 1 to 4) were pickled (with 1:1 hydrochloric acid at a temperature of 70° C. for 20 minutes). It was found as a result of the pickling that the flaking positions coincided with the poles of the respective rolling elements.

(Comparative Examples)

Then, for purposes of comparison, steel materials (billets) having the chemical composition (wt. %) shown in Table 3 and having a shape similar to those of Embodiments Nos. 1 to 4 were prepared.

TABLE 3

|  | No. | Type of steel | Chemical composition (wt. %) | | | | | | | | | |
| --- | --- | --- | --- | --- | --- | --- | --- | --- | --- | --- | --- | --- |
|  |  |  | C | Si | Mn | P | S | Ni | Cr | Mo | Cu | Ti |
| Comparative Example | 5 | CC | 1.01 | 0.26 | 0.37 | 0.014 | 0.004 | 0.04 | 1.45 | 0.02 | 0.30 | 0.002 |
|  | 6 |  | 0.98 | 0.27 | 0.39 | 0.011 | 0.007 | 0.04 | 1.39 | 0.02 | 0.08 | 0.003 |
|  | 7 |  | 0.97 | 0.23 | 0.41 | 0.014 | 0.003 | 0.08 | 1.40 | 0.01 | 0.09 | 0.003 |
|  | 8 |  | 1.01 | 0.23 | 0.35 | 0.015 | 0.008 | 0.07 | 1.48 | 0.01 | 0.05 | 0.001 |
|  | 9 |  | 0.98 | 0.22 | 0.36 | 0.017 | 0.003 | 0.06 | 1.39 | 0.02 | 0.07 | 0.002 |
|  | 10 |  | 1.02 | 0.24 | 0.34 | 0.011 | 0.004 | 0.09 | 1.41 | 0.01 | 0.04 | 0.003 |
|  | 11 |  | 1.03 | 0.28 | 0.36 | 0.012 | 0.007 | 0.08 | 1.43 | 0.02 | 0.07 | 0.003 |
|  | 12 |  | 1.01 | 0.27 | 0.33 | 0.016 | 0.007 | 0.07 | 1.37 | 0.01 | 0.10 | 0.002 |
|  | 13 |  | 0.99 | 0.22 | 0.37 | 0.014 | 0.010 | 0.10 | 1.45 | 0.01 | 0.08 | 0.002 |
|  | 14 |  | 0.97 | 0.24 | 0.36 | 0.013 | 0.012 | 0.09 | 1.41 | 0.02 | 0.06 | 0.003 |
|  | 15 |  | 0.98 | 0.25 | 0.41 | 0.009 | 0.009 | 0.10 | 1.37 | 0.02 | 0.07 | 0.004 |
|  | 16 |  | 1.02 | 0.24 | 0.42 | 0.010 | 0.015 | 0.06 | 1.42 | 0.01 | 0.09 | 0.002 |
|  | 17 |  | 0.99 | 0.31 | 0.38 | 0.011 | 0.018 | 0.08 | 1.46 | 0.02 | 0.05 | 0.001 |
|  | 18 | IC | 0.98 | 0.32 | 0.41 | 0.012 | 0.003 | 0.07 | 1.42 | 0.01 | 0.06 | 0.003 |
|  | 19 |  | 1.03 | 0.28 | 0.35 | 0.011 | 0.005 | 0.07 | 1.44 | 0.02 | 0.07 | 0.002 |
|  | 20 |  | 1.02 | 0.25 | 0.32 | 0.013 | 0.008 | 0.09 | 1.32 | 0.02 | 0.08 | 0.001 |

TABLE 3-continued

| No. | Type of steel | Chemical composition (wt. %) | | | | | | | | | |
|---|---|---|---|---|---|---|---|---|---|---|---|
| | | C | Si | Mn | P | S | Ni | Cr | Mo | Cu | Ti |
| 21 | | 1.00 | 0.30 | 0.38 | 0.010 | 0.006 | 0.12 | 1.38 | 0.01 | 0.10 | 0.003 |
| 22 | | 1.01 | 0.26 | 0.37 | 0.013 | 0.010 | 0.11 | 1.39 | 0.01 | 0.09 | 0.002 |
| 23 | | 1.02 | 0.27 | 0.41 | 0.014 | 0.005 | 0.10 | 1.40 | 0.02 | 0.06 | 0.001 |
| 24 | | 0.98 | 0.28 | 0.39 | 0.015 | 0.009 | 0.08 | 1.42 | 0.01 | 0.05 | 0.002 |
| 25 | | 0.99 | 0.29 | 0.39 | 0.013 | 0.013 | 0.07 | 1.48 | 0.01 | 0.08 | 0.013 |

Then, the oxygen contents (PPM) in steel of the respective steel materials (Comparative Examples Nos. 5 to 25) having the chemical composition shown in Table 3 were measured by a method similar to that of the aforementioned Embodiments.

The results of the measurement are shown in Table 4.

Then, the center segregation rates of carbon ($C/C_0$) of the respective steel materials (Comparative Examples Nos. 5 to 25) having the chemical composition shown in Table 3 were obtained by a method similar to that of the aforementioned Embodiments.

The results are shown in Table 4.

Then, using Comparative Examples Nos. 5 to 17 out of the steel materials having the chemical composition shown in Table 3, rolling elements were made by a process similar to that of the aforementioned Embodiments (as FIGS. 6(a)–6(b)). It should be noted that Comparative Examples Nos. 5 to 17 were subjected only to EMS as a measure to controlling center segregation when the steel materials (billets) were made.

Then, using Comparative Examples Nos. 18 to 25 out of the steel materials having the chemical composition shown in Table 3, rolling elements were made by a conventional ingot casting process.

Then, these rolling elements (Comparative Examples Nos. 5 to 25) were subjected to a rolling life test similar to that of the aforementioned Embodiments.

The results of the test are shown in Table 4.

TABLE 4

| | No. | Oxygen content in steel (ppm) | Center segregation rate (C/C0) | Rolling life ($L_{10}$) (hr) |
|---|---|---|---|---|
| Comparative Example | 5 | 8 | 1.15 | 380 |
| | 6 | 9 | 1.25 | 420 |
| | 7 | 6 | 1.40 | 455 |
| | 8 | 10 | 1.30 | 370 |
| | 9 | 13 | 1.05 | 428 |
| | 10 | 11 | 1.00 | 415 |
| | 11 | 14 | 1.20 | 370 |
| | 12 | 15 | 1.35 | 395 |
| | 13 | 8 | 1.05 | 460 |
| | 14 | 9 | 1.00 | 411 |
| | 15 | 11 | 0.90 | 390 |
| | 16 | 13 | 0.95 | 362 |
| | 17 | 15 | 1.30 | 304 |
| | 18 | 6 | 1.05 | 480 |
| | 19 | 8 | 1.00 | 501 |
| | 20 | 10 | 0.90 | 401 |
| | 21 | 8 | 0.95 | 395 |
| | 22 | 12 | 1.15 | 384 |
| | 23 | 14 | 1.20 | 325 |
| | 24 | 9 | 1.00 | 355 |
| | 25 | 13 | 1.20 | 275 |

Then, after the rolling life test was ended, all the rolling elements were pickled under conditions similar to those of the aforementioned Embodiments. It was found as a result of the pickling that the flaking positions coincided with the poles of all the rolling elements.

It was verified from Tables 1 to 4 that the rolling elements obtained from the steel materials (Embodiments Nos. 1 to 4) of this embodiment had a significantly improved rolling life ($L_{10}$) compared with Comparative Examples Nos. 5 to 25.

It was also understood that the rolling life ($L_{10}$) of Comparative Examples Nos. 5 to 17 was impaired due to at least one of the center segregation rate of carbon ($C/C_0$), the oxygen content in steel, and the sulfur content in steel being out of the conditions of the present invention, although Comparative Examples Nos. 5 to 17 were made of CC steels.

It was further understood that the rolling life ($L_{10}$) of Comparative Examples Nos. 18 and 19 was impaired due to their being made of IC steels compared with Embodiments Nos. 1 to 4 that were made of CC steels, although the center segregation rate of carbon ($C/C_0$), the oxygen content in steel, and the sulfur content in steel satisfying the conditions of the present invention.

The reason therefor is that the IC steel is inferior in quality to the CC steel because deoxidation products and the like are entrapped in the initially solidified layer due to accidental causes during ingot making to produce streak flaws and large inclusions.

In addition, it was understood that the rolling life ($L_{10}$) of Comparative Examples Nos. 20 to 25 was impaired compared with Comparative Examples Nos. 5 to 17 due to at least one of the center segregation rate of carbon ($C/C_0$), the oxygen content in steel, and the sulfur content in steel being out of the conditions of the present invention. That is, the reason why the rolling life ($L_{10}$) of the CC steel is longer than that of the IC steel is that the CC steel is superior to the IC steel in cleanness as well as streak flaw.

Moreover, it was understood that the rolling life could be particularly improved when the conditions that the oxygen content in steel is 10 ppm or less and that the sulfur content is 80 ppm or less were satisfied, as long as the center segregation rate of carbon ($C/C_0$) of the steel material is between 0.9 and 1.1.

Then, the center segregation rates of carbon ($C/C_0$) of the tested rolling elements were measured by the aforementioned method of measuring the center segregation rate of carbon ($C/C_0$) of a steel as a finished product (rolling element). It was verified from the measurement that the center segregation rates were substantially the same as those of the steel materials. Therefore, it was also verified that the rolling elements, whose center segregation rates of carbon ($C/C_0$) measured by the two methods are between 0.9 and 1.1 and whose oxygen and sulfur contents in steel satisfy the conditions of the present invention (i.e., the rolling elements of the present invention), had a satisfactory rolling life similar to the aforementioned.

Then, the center segregation rates of sulfur ($S/S_0$) (impurity element other than carbon) of the steel materials of Embodiments Nos. 1 to 4 and Comparative Examples Nos. 5 to 25 were obtained, where S is the sulfur concentration (wt. %) in the center portion of the steel materials and $S_0$ is the average sulfur concentration (wt. %). The method employed was similar to the aforementioned.

The results are shown in FIG. 1(a).

Figure 1B:
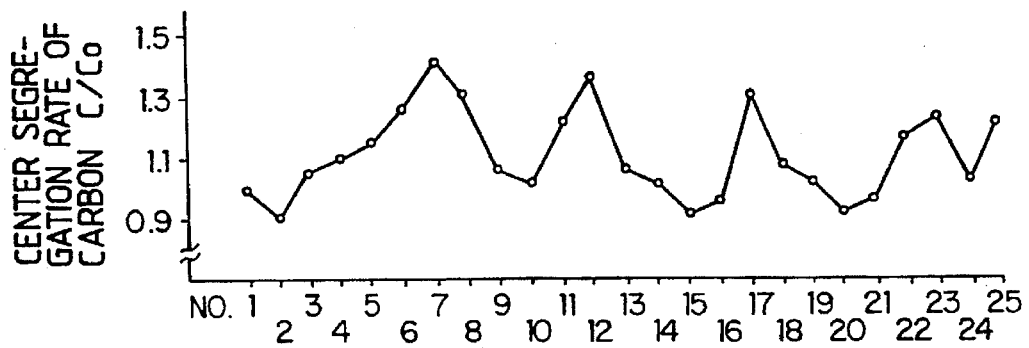
FIG. 1(b) is a diagram showing center segregation rates of carbon ($C/C_0$) of steel materials of Embodiments Nos. 1 to 4 of the present invention and of Comparative Examples Nos. 5 to 25.

It should be noted that the center segregation rates of carbon ($C/C_0$) of the steel materials obtained from Embodiments and Comparative Embodiments are shown in FIG. 1(b).

It was understood from FIGS. 1(a) and 1(b) that the center segregation rate of sulfur ($S/S_0$) exhibited substantially the same tendency as the center segregation rate of carbon ($C/C_0$). Accordingly, the rolling life can be improved also by limiting the center segregation rate of sulfur ($S/S_0$).

Then, nonmetallic inclusions in the center portion of the steel materials obtained by Embodiments and Comparative Examples were measured in the following way.

The measurement was made on cross-sections in the rolling direction including the center of the steels using a microscope. Each cross-section had a test plane of 320 mm$^2$ area based on JIS G 0555 specified on "pages 302 to 303 in JIS Handbook, 1993, Iron Steel, published by the Japanese Standards Association".

Figure 1C:
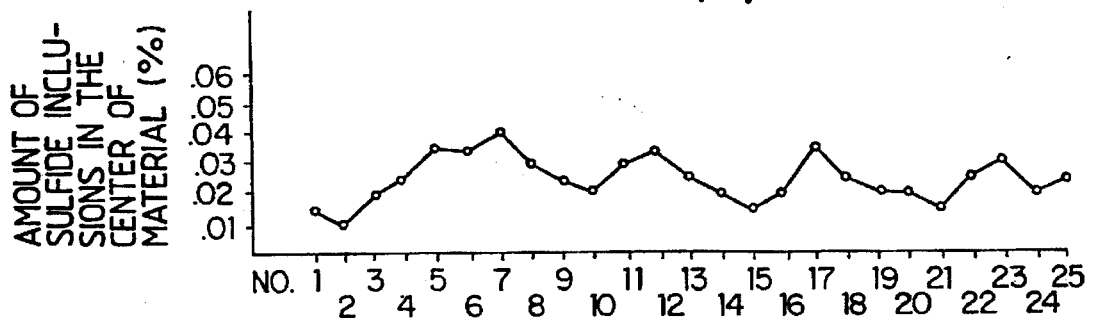
FIG. 1(c) is a diagram showing the amounts of sulfide inclusions in a center portion of steel materials of Embodiments Nos. 1 to 4 of the present invention and of Comparative Examples Nos. 5 to 25.
Figure 1D:
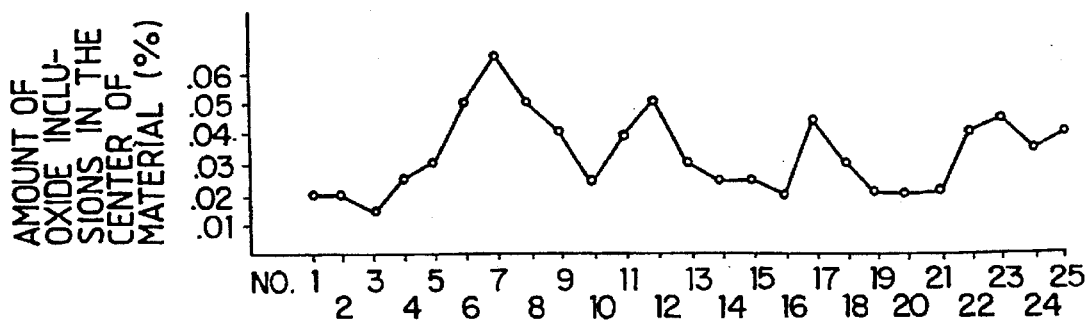
FIG. 1(d) is a diagram showing the amounts of oxide inclusions in the center portion of steel materials of Embodiments Nos. 1 to 4 of the present invention and of Comparative Examples Nos. 5 to 25.
Figure 2:
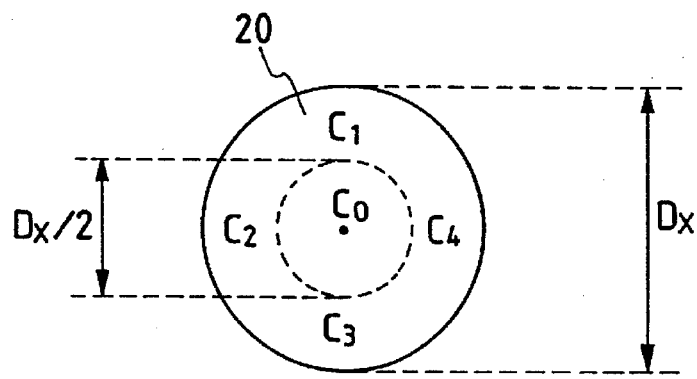
FIG. 2 is a diagram showing a part of a method of evaluating the center segregation rates of carbon ($C/C_0$) of steel materials of the embodiments of the present invention.
Figure 3:
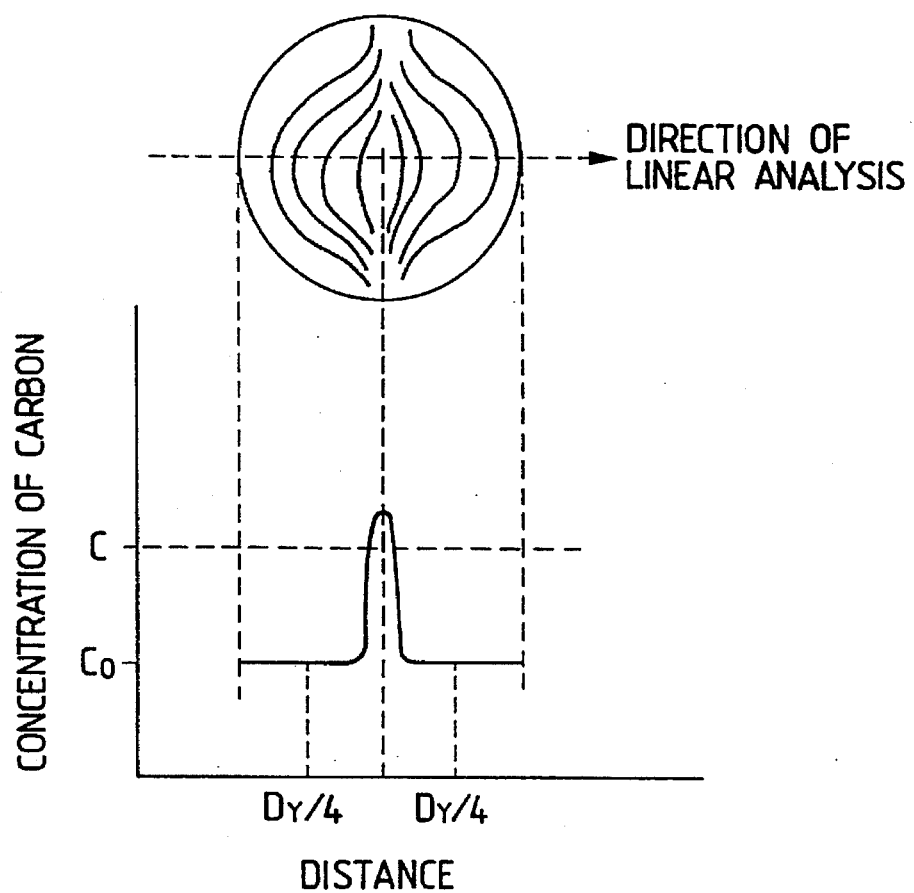
FIG. 3 is a diagram showing a part of a method of evaluating the center segregation rates of carbon ($C/C_0$) of steels as a finished product (rolling element) of the embodiments of the present invention.

The amounts of sulfide inclusions in the center portion of the steel materials obtained by Embodiments Nos. 1 to 4 and Comparative Examples Nos. 5 to 25 are shown in FIG. 1(c), and the amounts of oxide inclusions in the center portion of the steel materials obtained by Embodiments Nos. 1 to 4 and Comparative Examples Nos. 5 to 25 are shown in FIG. 1(d).

It was understood from FIGS. 1(c) and 1(d) that the amounts of sulfide inclusions in the center portion of the steel materials and the amounts of oxide inclusions in the center portion of the steel materials were affected by the center segregation rate of carbon ($C/C_0$) and the center segregation rate of sulfur ($S/S_0$).

The sulfide inclusion is classified as Group A inclusions in both JIS and ASTM standards and is characterized by being slenderly elongated in the rolling direction of a steel material. The sulfide inclusions are present in large amounts in the segregated center portion of a steel material, increasing not only sulfide inclusions but also oxide inclusions. Slender sulfide inclusions extend in a direction perpendicular to the surface at the poles of a rolling element made of a CC steel, making a source of stress concentration, together with oxide inclusions, under repetitive rolling contact stresses. Thus, it was verified that the sulfide inclusions adversely affect the improvement of the rolling life.

It should be noted that the lower limit of the center segregation rate of carbon ($C/C_0$) is about 0.9 in terms of the manufacturing practice using general center segregation control processes such as EMS and light reduction with pinch rolls. The application of such a control method requiring tremendous equipment investment as the continuous forging process would not be recommended from the viewpoint of cost.

It should be noted that while the balls are used as the rolling elements in this embodiment, the invention is, of course, applicable to all types of rolling elements including cylindrical rollers, tapered rollers, and barrel-shaped rollers.

Further, while the rod-like member whose cross-section is circular is used as a material in this embodiment, the material may be a rod-like member whose cross-section is polygonal.

The rolling bearing of the present invention is characterized by having the rolling element made of a continuously cast bearing steel, with the center segregation rates of carbon, $C/C_0$, of a steel material and a steel as a finished product satisfying the condition, $0.9 \leq C/C_0 \leq 1.1$, as well as with the oxygen content in steel being 10 ppm or less and the sulfur content in steel being 80 ppm or less. Therefore, even if the rolling element is made by continuous casting, occurrence of flaking and cracking at the poles of the rolling element can be suppressed. As a result, the rolling life of the bearing can be improved significantly, the cost of manufacture can be reduced, and the quality can be improved, and hence a rolling bearing with a long life can be obtained.

What is claimed is:

1. A ball of a rolling bearing, wherein said ball is made of a continuously cast bearing steel;

a center segregation rate of carbon, C/Co, of said ball satisfies the condition, $0.9 \leq C/C_0 \leq 1.1$, where C is a carbon concentration as a percentage of weight substantially at a center point of a center line, within said ball passing through a pair of poles on a surface of said ball, and Co is an average carbon concentration as a percentage of weight substantially on a circumference of a circle, said circle orthogonally intersecting said center line, being located on a plane containing said center point of said center line, and having a diameter that is half of the diameter of said ball, said circle having a center that is coincident with said center point of said center line; and said bearing steel contains oxygen in amounts of 10 ppm or less and sulfur in amounts of 80 ppm or less.

2. A ball of a rolling bearing as claimed in claim 1, wherein a center segregation rate of sulfur, S/So, of said ball satisfies a condition, $0.9 \leq S/So \leq 1.1$, where S is a sulfur concentration as a percentage of weight substantially on said center point and So is an average sulfur concentration as a percentage of weight substantially on said circumference of said circle.

* * * * *

REEXAMINATION CERTIFICATE (4157th)

United States Patent
Abe et al.

[11] B1 5,658,666
[45] Certificate Issued: Sep. 19, 2000

[54] ROLLING BEARING

[75] Inventors: Tsutomu Abe; Kyozaburo Furumura, both of Kanagawa, Japan

[73] Assignee: NSK Ltd., Tokyo, Japan

Reexamination Request:
No. 90/005,244, Feb. 2, 1999

Reexamination Certificate for:
Patent No.: 5,658,666
Issued: Aug. 19, 1997
Appl. No.: 08/616,937
Filed: Mar. 18, 1996

Related U.S. Application Data

[63] Continuation of application No. 08/331,751, Oct. 31, 1994, abandoned.

[30] Foreign Application Priority Data

Oct. 29, 1993 [JP] Japan ................................. 5-272544

[51] Int. Cl.$^7$ .................................................. B32B 9/00
[52] U.S. Cl. .......................... 428/408; 384/490; 384/494; 384/493; 384/492; 384/516; 384/907; 164/47; 164/459; 164/476; 29/527.7
[58] Field of Search ................................ 384/490, 492, 384/494, 907; 164/47, 459, 476; 428/408

[56] References Cited

PUBLICATIONS

Kumagai, K. et al., "Fatigue Life of High—Carbon Chromium Ball Bearing Steel Produced by Electric Furnace—Vacuum Slag Cleaner—Ladle Furnace—RH Degassing—Curved Continuous Caster", ASTM STP 987 Ed. J.C.C. Hoo pp. 348–359; 1988.
Uesugi T., "Production of High—Carbon Chromium Bearing Steel in Vertical Type Continuous Caster", Trans, ISIJ, vol. 26 pp. 614–620; 1986.
Zaretsky, E.V., STLE Life Factors for Rolling Bearings, STLE Publ. US, pp. 106–107; 1992.
Carter, T.L., A Study of Some Factors Affecting Rolling—Contact Fatigue Life, NASA TR R–60; 1960.
Chevalier, J.L. et at, "A New Criterion for Predicting Rolling Fatigue Lives of Through Hardened Steels", J. Lub. Eng. Trans ASME Jul., pp. 287–297; 1973.
Kiessling, R. & Baecktröm, Electron Probe X–ray Microanalysis I Application to Segregation in Ball Bearing Steels', Jernkont, Ann. 145:5, pp. 255–260; 1961.
Krejci, J. et al, Bands and Chemical Heterogeneity in a Bearing Steel', Kovove Materialy, vol. 26, No. 2 pp. 147–163; 1988.
Listopad, V.I. et al, "Improvements in Quality of Bars Rolled from Continuously Cast Bearing Steel and in Durability of Bearings", Steel in the USSR vol. 22, No. 1, Jan. pp. 34–35; 1992.
Tsubota K. & Fukumoto I., "Production and Quality of High Cleanliness Bearing Steel", Proc. $6^{th}$ Int. Iron & Steel Congress, ISIJ, Nagoya, pp. 637–643; 1990.
Polanschütz, W. et al,, "Electromagnetic Improvement of Inner Quality of Continuously Casted Blooms", Randex–Rundscau Heft 2 pp. 364–374; 1987.
Bobadilla M. et al, "Solidification Process in 52100 Grade", Proc. of Ascometal Bearing Steel Symp., Arles, France 35/27 Sep.; 1989.
Nakata H. & Takahashi H.,, "Improvement of CC Bloom Internal Quality in High Carbon Steel", Proc. of Electric Furnace Steel Conference, vol. 62, Nr. 1, pp. 42–48, 1991; and English Translation.

(List continued on next page.)

*Primary Examiner*—Rich Weisburger

[57] ABSTRACT

A rolling element of a rolling bearing is made of a continuously cast bearing steel, and the center segregation rate of carbon, $C/C_o$, of the bearing steel material satisfies a condition, $0.9 \leq C/C_o \leq 1.1$, where C is the concentration of carbon (wt. %) in a center portion and $C_o$ is the average concentration of carbon (wt. %).

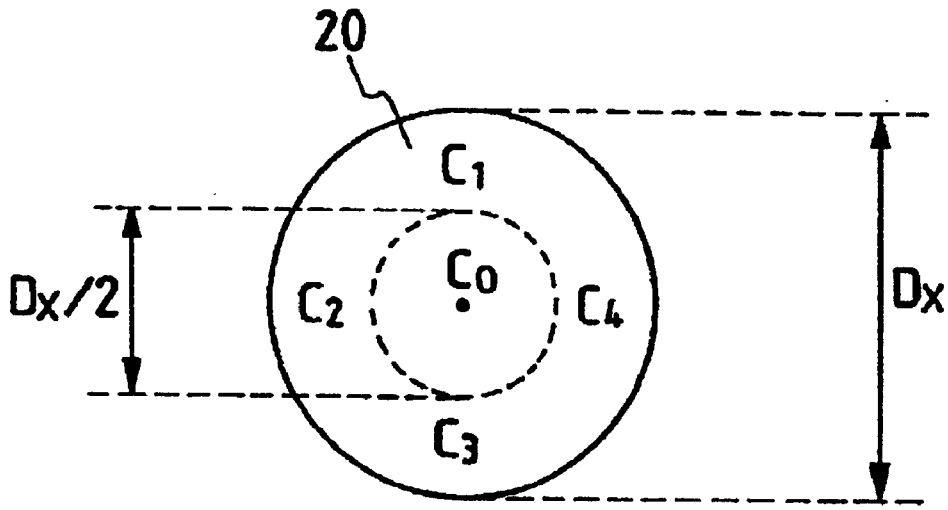

OTHER PUBLICATIONS

Yangishima, F. et al, "Production of High Quality Rod and Bar by Applying Continuous Forging Process", Kawasaki Steel Giho, vol. 23, No. 2, pp. 91–97, 1991; and English Translation.

Bersch, B., Einfluss der Siegerungen bei Strangguss auf die Werkstoffeigenschaften, Stahl u. Eisen 106, Apr. Nr. 7, pp. 323–331; 1986.

SKF, "Deep groove ball bearings", 1989, Catalogue 4000 E, p. 175.

M. Suzuki et al., "Improvement in center segregation of high carbon steel continuous casting blooms", La Revue de Metallurgie—CIT, pp. 83–92, Jan. 1992.

ASTM E 1019–94, "Standard Test Methods for Determination of Carbon, Sulfur, Nitrogen, and Oxygen in Steel and in Iron, Nickel, and Cobalt Alloys", pp. 265, 270 and 283, 1994 (original published 1984).

ASM Metals Handbook, 9$^{th}$ Edition, "Materials Characterization", vol. 10, pp. 524–525, 1986.

D. R. Poirier, "Macro segregation & Homogenisation of Low Alloy Steel", Masters Thesis, Massachusetts Institute of Technology, pp. 16–18, May 1963.

J. M. Beswick, Measurement of Carbon Levels in Structurally Transformed SAE 52100 Ball Bearing Steel by Microprobe Analysis, *Practical Metallography*, 12, pp. 200–206, 1975.

J. M. Beswick, "The Practicality of Performing Quantitative Electron Microprobe Analysis Using an Energy Dispersive Spectrometer", *Practical Metallography*, 14, pp. 209–222, 1977.

D.R. Poirier and M. C. Flemings, "Investigation of Solidification of High Strength Steel Castings", Massachusetts Institute of Technology/US Army Materials Research Agency Report, Contact DA–19.020–AMC.5443(X) (document with unlimited distribution), pp. 36–37, 1965.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *